United States Patent [19]

Kenyeres

[11] Patent Number: 5,186,225
[45] Date of Patent: Feb. 16, 1993

[54] THREE-DIMENSIONAL MATERIAL CUTTING ASSEMBLY

[76] Inventor: Peter Kenyeres, 2439 W. Grand Ave., Chicago, Ill. 60612

[21] Appl. No.: 808,532

[22] Filed: Dec. 16, 1991

[51] Int. Cl.$^5$ .............................................. B27C 9/02
[52] U.S. Cl. .................................. 144/2 N; 144/2 R; 144/1 F; 144/49; 144/134 D; 403/53; 241/101.7
[58] Field of Search ............... 241/101.7; 83/565, 928, 83/587; 144/2 R, 2 N, 1 E, 1 F, 49, 134 R, 134 D, 136 C; 403/53, 57, 58

[56] References Cited

U.S. PATENT DOCUMENTS

| | | | |
|---|---|---|---|
| 3,123,112 | 3/1964 | Hodges et al. | 144/134 R |
| 3,198,224 | 8/1965 | Hiley | 144/2 N |
| 3,205,522 | 9/1965 | Then | 403/53 |

Primary Examiner—W. Donald Bray
Attorney, Agent, or Firm—Paul Y. Feng

[57] ABSTRACT

A light weight, mobile, and flexible holder assembly for cutting tools is described. It enables the user to make three dimensional adjustments to the orientation of the cutting tool so as to make cuts in a plurality of patters on workpieces of practically any size. A single holder may be adapted for tools of a range of sizes.

7 Claims, 1 Drawing Sheet

THREE-DIMENSIONAL MATERIAL CUTTING ASSEMBLY

FIELD OF THE INVENTION

This invention relates to an assembly for converting conventional cutting tools into a light weight, mobile, and three-dimensionally adjustable cutting assembly. Because the workpiece remains stationary, the assembly can be used with objects of practically any size and for the production of cuts in a plurality of patterns.

BACKGROUND OF THE INVENTION

It has been known heretofore to mount power tools such as routers, sabre saws, and the like onto fixed or movable structures for a variety of workshop applications. As a rule, however, the orientations of the cutting tool mounted onto such structures cannot be easily adjusted. In some systems, the cutting tool is spatially completely fixed, and patterns can only be achieved by moving the workpiece. In other systems, movement of the cutting tool in one or two dimensions is possible but the structural complexities of such assemblies and hence their cost made them less accessible to many potential users.

Improved structures for mounting power tools appear regularly in the prior art. A combination electric table saw and folding, mobile work bench is described in U.S. Pat. No. 4,969,496 to Dennis R. Romans. It relates to a space saving structure where the machine tool is affixed to a mobile work bench whose legs can be folded into the frame structure of the work bench and which can be stored in a vertical orientation. In U.S. Pat. No. 4,515,191 to James R. Fetty is described a radial universal tool which can selectively perform a variety of one-dimensional functions of a table saw, wood and metal lathe, drill press, horizontal boring machine, milling machine, and disc sander. In U.S. Pat. No. 4,265,283 to Edward M. Nash and Edward M. Johnson, Jr. is described a mobile work bench for mounting a plurality of electrically operated handtools and discloses a structure permitting the mounting of a variety of electrically powered hand tools and converting the latter into stationary power tools. Similarly, a folding workshop tool stand is described in U.S. Pat. No. 3,184,190 to Russell B. Halfinger. It permits the connection of a variety of tools to one motor driven unit and the stand may be stored out of the way while not in use.

Good control of a power tool is often difficult. Accordingly, the use of guides such as templates or the like are also reported in the patent literature. A recent one is a cutting tool guide assembly described in U.S. Pat. No. 4,947,910 to Raymond P. Reneau in which a trolley is used to guide a cutting tool in a one-dimensional movement for making a precise cut on the workpiece. Among others, a machine for precise cutting and finishing of curved wooden members is described in U.S. Pat. No. 4,688,612 to Michael Kessel, Ervin Kessel and Eugene Schneider, but this machine has only limited capabilities in two dimensional vertical and rotational movements. For more intricate patterns, the use of undulatory rails on a track is described in U.S. Pat. No. 4,319,615 to Henry A. Ditmanson and Helen Donaldson. Similarly, in U.S. Pat. No. 4,299,263 to Charles D. Skinner is described a table using a template holding frame for the creation of designs of varying depth and width.

Most of the tool mounting structures such as a workbench and the like remain stationary during operation. One portable frame for cutting large objects is described in U.S. Pat. No. 3,123,112 to Hubert Earl Hodges and Burton Garvin Frame. In this improvement, a cutting tool is affixed to a wheeled frame permitting two dimensional cutting of a tree stump with improved stability of movement and reduced hazard to the operator. However, the Hodges invention is not designed for use in making patterned cuts.

SUMMARY OF THE PRESENT INVENTION

The objective of the present invention is to provide a tool mounting assembly which permits a user to make three-dimensional adjustments of the orientation of the cutting tool. This is achieved by using a combined rotating-pivoting means to mount the tool holder to a wheeled chassis. As a result, a user can shape materials of virtually any size and in partically any pattern.

The structural design of the present invention is remarkably simple, as is its actual use. It should therefore be accessible to skilled craftsmen and to serious amateurs. These and other features and advantages of the invention will be more readily apparent upon reading the following detailed description of the preferred embodiment of the invention and upon reference to the accompanying drawings.

Figure 1:
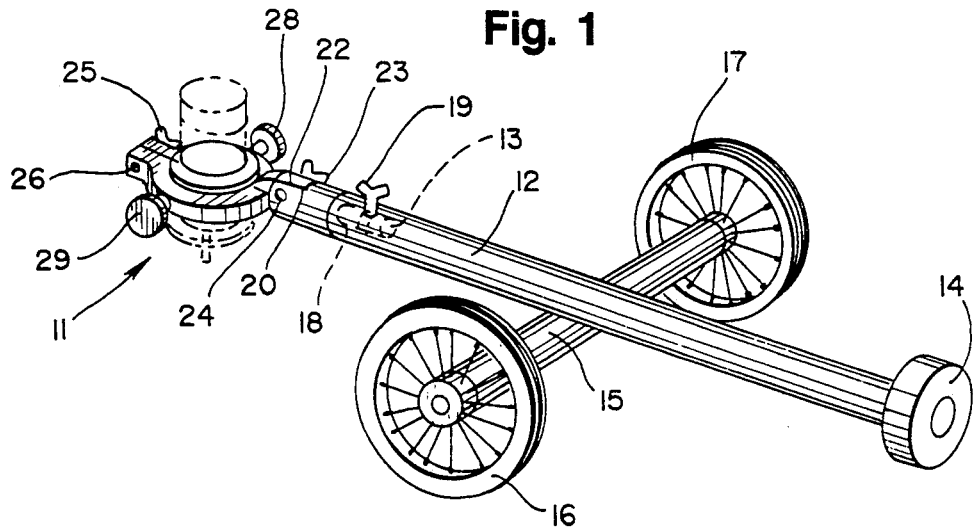
FIG. 1 is an overview of the tool mounting assembly. It shows a cylindrical chassis rod with a counter-balance at one end, and a cylindrical cavity at the other end. The rod chassis is mounted onto an axle having two free, independently moving wheels. A mounting rod, in the form of a cylindrical rod with one end reduced in size, is inserted into the cylindrical cavity of the chassis rod and secured by a wing-nut screw. The other end of the mounting rod is notched in order to mount pivotably a flattened pivoting end of a tool holder. A wingnut-bolt combination is then inserted into the notched end of the mounting rod and the pivoting end of the tool holder. Tightening of this wingnut-bolt combination serves to affix the orientation of the tool holder with respect to the chassis rod.
Figure 2:
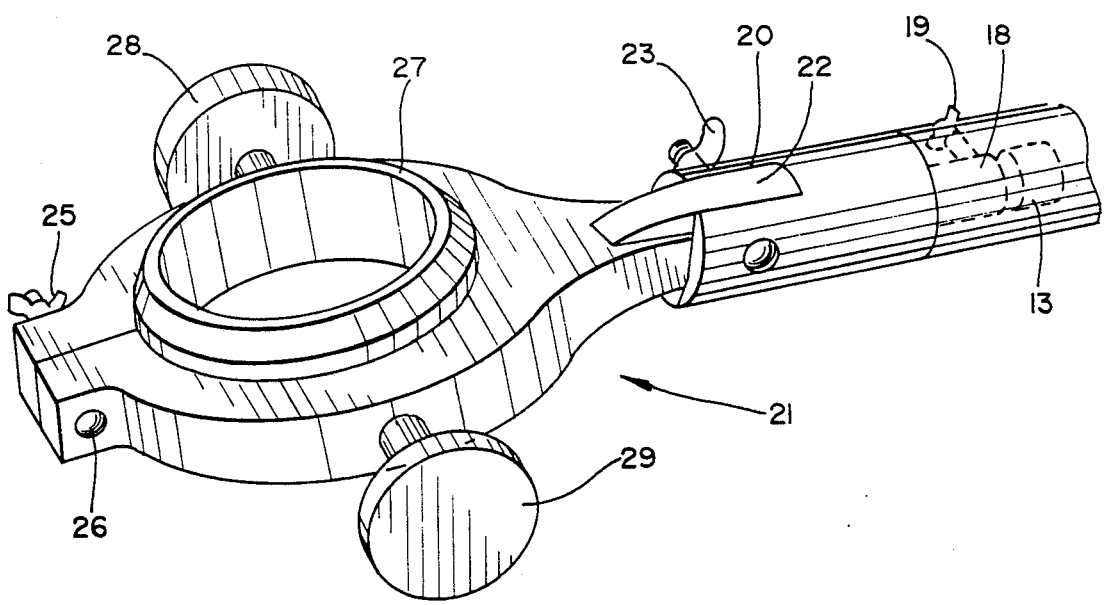

A detailed drawing of the cutting-tool holder is shown in FIG. 2. The end opposite to the pivoting end is split and is similarly tightened by means of a wingnut-bolt combination. A bushing of suitable size may be inserted to accommodate power tools with physical dimensions smaller than the tool holder. In addition, a pair of guiding handles are also attached to the rim of the holder for the operator to guide the movement of the tool.

DESCRIPTION OF THE PREFERRED EMBODIMENTS

The cutting assembly, generally designated by the reference numeral 11, includes a cylindrical chassis rod 12 having a cylindrical cavity 13 at one end and a counter balance 14 at the other end. The chassis rod 12 is mounted onto an axle 15 to which are attached two freely, and independently rotating wheels 16 and 17.

Inserted into the cylindrical hole 13 is the reduced end of the mounting rod 18, and is secured in the assembly by the wingscrew 19. The other end of the mounting rod 18 is joined at the notch 20 with the flattened end 22 of the tool holder 21 by means of a wingnut-bolt combination 23. The opposite end 26 of the tool holder 21 is slotted open so that it can be tightened by the wingnut-bolt combination 25. If necessary, a bushing 27 of suitable size may be inserted to adapt the tool holder to power tools of smaller physical dimensions. Two guiding handles, 28 and 29, are attached to the tool holder.

The tool assembly may be constructed from hardwood, high impact plastic, or metal. For an average user, the chassis rod 12 should have a length of approximately 30–35 inches (75–90 cm), and a diameter of approximately 2–2.5 inches (5–6 cm). The inner diameter of the cylindrical cavity 13 should be at least 0.5 inches (1.25 cm) and its depth should be at least 2 inches (5 cm). The mass of the counterbalance 14 depends on the weight of the tool being used, but is typically on the order of about 10 pounds (5 kg). The diameter of the axle 15 should be about 1.5 to 2 inches (4–5 cm). The two wheels 16 and 17 can be of any size, but preferably their diameter should be 9 inches (22.5 cm) or greater.

The diameter of the mounting rod 18 should be approximately the same as that of the chassis rod 12 (2–2.5 inches) and the diameter of the reduced end of the mounting rod 18 should be only slightly smaller than the inner diameter of the cylindrical cavity 13 so that the mounting rod could be rotated effortlessly but yet easily securable by the wingnut screw 19. The dimensions of the tool holder 21, the pivoting notch 20, and the guiding handles 28 and 29 are not critical but should be sufficiently large to accommodate a portable power tool such as a router or the like and be of such a size as to be comfortable to the user. Similarly, the sizes of the wingnut screw 19 and the wingnut-bolt combinations 23 and 25 are also not critical, but should be at least approximately 0.2 inches (5 mm) in diameter to provide sufficient mechanical strength.

In actual use, a power tool such as a router or the like is inserted into the tool holder 21 with, if needed to adapt the holder to a cutting tool of smaller physical dimensions, bushing 27. The slotted end 26 of the tool holder 21 is then tightened with the wingnut 25, and orientation of the cutting tool is adjusted by loosening the wingnut screw 19 and rotating the mounting rod, loosening the wingnut-bolt combination 25 and pivoting the tool holder, or a combination of both.

The preceding description is based on a prototype representing the present best mode using a router as the power tool. However, it will be appreciated that those skilled in the art, upon consideration of this disclosure, may make modifications and improvements within the scope of this invention.

I claim:

1. A cutting system having a cutting-tool holder mounted onto a chassis rod secured to an axle with wheels, the improvement comprising:
   (a) a chassis rod;
   (b) a tool holder;
   (c) a means to mount rotably and pivotably said tool holder to one end of said chassis rod;
   (d) a horizontal axle secured perpendicularly under said chassis rod;
   (e) two wheels independently mounted onto said axle;
   (f) a counter-balance mounted on another end of said chassis rod; and
   (g) at least one guide handle attached to said tool holder.

2. The chassis rod as recited in claim 1 with a concentric cylindrical cavity in one end and a set-screw hole perpendicularly drilled from the surface of the rod to said cylindrical cavity.

3. The tool holder as recited in claim 1 further comprising:
   (a) a central circular ring;
   (b) one elongated end with flattened sides, said end being rigidly affixed to the circular ring with the flat sides oriented perpendicularly to the plane of said circular ring and with a hole drilled near the center of said end through both surfaces of the flattened sides;
   (c) a second elongated end rigidly affixed 180 degrees apart from the first end, said second end having a split perpendicular to the plane of said circular ring and two concentric holes drilled through both sides of the split;
   (d) a bushing to adapt said tool holder to cutting tools of smaller physical dimensions; and
   (e) a wingnut-bolt combination inserted through the two holes of the second elongated end whereby when said wingnut-bolt combination is tightened, the cutting tool will be secured affixed within the tool holder.

4. The mounting means as recited in claim 1 further comprising:
   (a) a mounting rod, one end of said rod having been reduced in diameter to fit into the cylindrical cavity of the chassis rod, the other end of said rod having been notched to fit the flatted end of the tool holder and having two concentric holes drilled through the two branches of the notched end;
   (b) a set screw threaded through the set screw hole in said chassis rod to secure the mounting rod; and
   (c) a bolt inserted through the notched end of the mounting rod and the flattened end of the tool holder, said bolt being secured by a nut with similar threads.

5. The wheels as recited in claim 1 wherein the axis of the wheels is located under the middle one-third of length of the chassis rod.

6. The counter-balance as recited in claim 1 wherein its weight is within 25% to 400% of the weight of a cutting tool to be inserted into the tool holder.

7. The guide handle as recited in claim 1 wherein its length is at least 1 inch (2.5 centimeters).

* * * * *